United States Patent Office 2,740,485
Patented Apr. 3, 1956

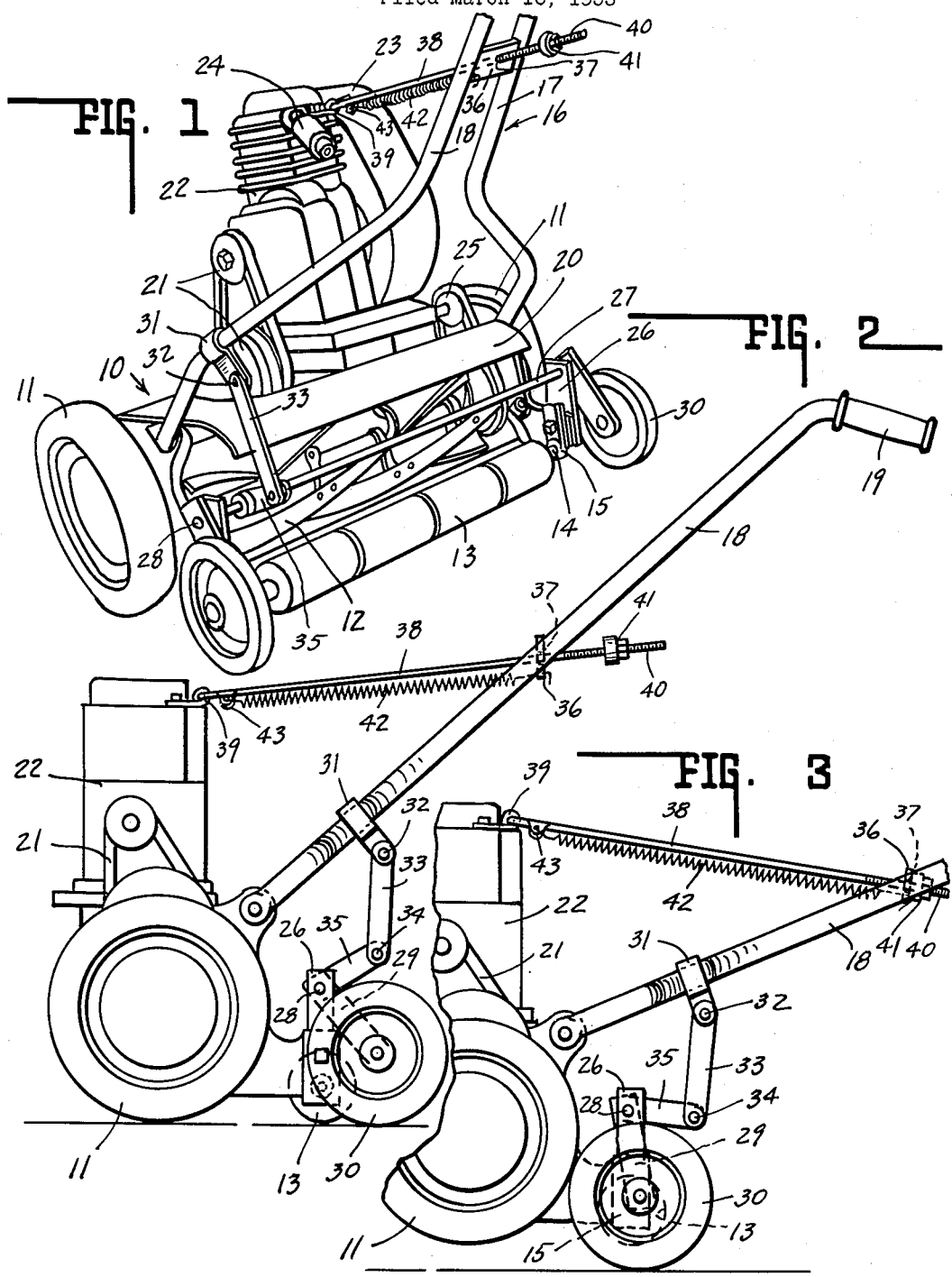
April 3, 1956     W. L. MOHLER     2,740,485
REVERSING MECHANISM FOR POWER LAWN MOWERS
Filed March 16, 1953
INVENTOR.
WAYNE L. MOHLER.
BY
Lockwood, Galt, Woodard & Smith.
ATTORNEYS.

2,740,485

REVERSING MECHANISM FOR POWER LAWN MOWERS

Wayne L. Mohler, Frankfort, Ind.

Application March 16, 1953, Serial No. 342,429

2 Claims. (Cl. 180—19)

This invention relates to a reversing mechanism for power lawn mowers.

As is well known, power mowers are relatively bulky and of considerable weight. As a result, when it becomes necessary to back up the mower such for example as upon inclines, adjacent trees, shrubbery and the like, a considerable amount of effort must be expended. The work is thus made tedious because of the bulk and weight of the mower. It is the primary object of this invention to eliminate the necessity of manually backing up such mowers. This is accomplished through the provision of an accessory reversing mechanism mounted upon the mower and readily operable with a minimum of ease to effect mower reversal.

It is a further object of the present invention to provide an accessory reversing mechanism which is simple and inexpensive in construction and has a minimum number of parts subject to repair.

It is a still further object of the present invention to provide means for ready adjustment of said reversing mechanism so that efficiency of operation may always be maintained regardless of the character of the contour of the terrain being mowed.

It is a still further object of the present invention to provide means associated with the mower handle for facilitating the frictional operating association of the reversing mechanism with the mower wheels.

It is a still further object of the present invention to provide an accessory reversing mechanism which may be readily attached to and operably connected with a conventional power mower.

The full nature of the invention will be understood from the accompanying drawings and the following description and claims:

Fig. 1 is a perspective view of a power mower with the invention affixed thereto.

Fig. 2 is a side elevation view of the invention operably associated with a power mower, wherein the invention is shown in non-reversing position.

Fig. 3 is a side elevation view with parts broken away of the invention shown in operating reversing association with a power mower.

In the drawings a conventional mower is shown generally at 10, the wheels thereof are shown at 11, the reel at 12 and the roller at 13. The roller has a shaft 14 suitably journalled in a plate 15 that is a part of the side frame of the power mower. The handle of the mower is shown generally at 16, it comprising the substantially Y-shaped and diverging elongated arms 17 and 18 terminating in the hand grasping portions 19.

Mounted upon the frame of the mower is a shield 20 adapted to keep the grass from being thrown upwardly and to direct it rearwardly and downwardly. A conventional clutch mechanism is shown at 21, the motor at 22, an air cooling system at 23 and an exhaust at 24. The driving mechanism connected to the reel is shown generally at 25.

Bolted or otherwise suitably secured to the plate 15 is an upstanding and vertically adjustable bearing 26. Bridging the space between opposed bearings 26 and rotatably therein is a rod 27 having portions 28 extending through and beyond said bearings. Fixedly connected to each of said portions is a plate 29 upon the lower end of which is mounted an auxiliary and reversing wheel 30.

Connected to at least one of the handle arms 18 is a U-clamp 31 which is adjustable on said arm. Pivotally connected to said U-clamp by the bolt 32 is a link 33 to the lower end of which is pivotally connected at 34 a link 35. The last mentioned link is secured to the rod 27.

Bridging the space between opposed handle arms 17 and 18 and connected to the handles is a bearing 36 having an aperture 37 formed therethrough. Extending through the aperture and therebeyond is a handle bracing rod 38, the inner end of which is suitably secured at 39 to the mower frame. The outer free end of said rod is screw threaded as at 40 for the reception thereupon of the adjustable stop nut 41. The rod is normally freely slidable through the bearing aperture to permit free arcuate movement of the mower handle. The stop nut, of course, limits the rearward arcuate movement of the handle, and if it is desired to change the distance of such rearward movement it is necessary only to change the position upon the rod of the stop nut 41. In order to retain the handle normally in the conventional upstanding position a spring 42 is provided. One end of this spring is connected to the bearing 36 while the other end is secured to a lug 43 connected to the inner extremity of said rod. As is apparent, the arcuate rearward movement of the handle will be against the bias or the constraint of the spring. As a result, as the handle is released the spring will urge the handle to the position shown in Figs. 1 and 2.

In operation, when it becomes desirable to reverse the mower it is necessary only to pull rearwardly upon the handles whereupon the linkage 33 and 35 will permit of a relative movement between the auxiliary wheels and the mower wheels until the two are in frictional engagement one with the other. As appears from the drawings the auxiliary wheels are in alignment with the mower wheels. As is also apparent, the mower wheels will be swung upwardly off the ground whereupon their rotation will impart reverse movement to the auxiliary wheels thereby causing the entire mechanism to move rearwardly. When it is desirable once again to move forwardly, the handle is swung arcuately forwardly until the mower wheels again engage the ground at which time the auxiliary wheels will be in spaced relation thereto as shown in Figs. 1 and 2.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. In a power lawn mower including a frame having a pair of power driven wheels mounted at opposite ends thereof and diverging handle arms pivotally secured to said frame; a reversing mechanism for said mower comprising a horizontal rod carried by said frame rearwardly of said wheels, ground engaging rotatable elements secured to said rod and in alignment with said wheels, linkage connecting said rod and at least one of said arms, and a second rod secured to said frame at one end and slidably connected to said arms adjacent its other end, said second rod having stop means adjustably carried adjacent said other end to limit the rearward arcuate movement of said arms relative to said frame whereby said wheels are raised off of the ground into engagement with said elements.

2. In a power lawn mower including a frame having a pair of power driven wheels mounted at opposite ends thereof and diverging handle arms pivotally secured to said frame; a reversing mechanism comprising a horizontal rod journalled at opposite ends in said frame rearwardly of said wheels and having end portions extending beyond said frame, a pair of ground engaging rotatable elements secured to said end portions respectively and in alignment with said wheels, linkage secured at one end to said rod and adjustably connected at the other end to one of said arms, and means operably associated with said arms and with said frame to limit the rearward movement of said arms and to normally retain them in a generally upstanding position, said means comprising an apertured bearing bridging the space between and secured to said arms, a second rod connected at one end to said frame and slidably mounted in said bearing adjacent its free end, said second rod having adjacent its free end an adjustable stop member limiting the rearward movement of said arms, and resilient means connected at one end to said rod and at the other end to said bearing whereby upon the rearward arcuate movement of said arms said wheels are raised from ground engagement position into engagement with said elements.

References Cited in the file of this patent

UNITED STATES PATENTS

| | | |
|---|---|---|
| 2,464,980 | Kuehn | Mar. 22, 1949 |
| 2,604,747 | Bash | July 29, 1952 |